(12) United States Patent
Ren et al.

(10) Patent No.: US 8,766,605 B2
(45) Date of Patent: Jul. 1, 2014

(54) BRIDGELESS PFC CONVERTER AND THE METHOD THEREOF

(75) Inventors: Yuancheng Ren, Hangzhou (CN); Bo Zhang, Hangzhou (CN); Miao Lei, Hangzhou (CN); Junming Zhang, Hangzhou (CN); James C Moyer, San Jose, CA (US); Eric Yang, Saratoga, CA (US)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 262 days.

(21) Appl. No.: 13/310,306

(22) Filed: Dec. 2, 2011

(65) Prior Publication Data

US 2012/0139505 A1 Jun. 7, 2012

(30) Foreign Application Priority Data

Dec. 2, 2010 (CN) .......................... 2010 1 0578957

(51) Int. Cl.
*H02M 7/17* (2006.01)

(52) U.S. Cl.
USPC ............................... 323/207; 363/61; 363/70

(58) Field of Classification Search
USPC ............ 323/207, 222; 363/61, 67, 69–70, 89, 363/125, 127, 44–48
See application file for complete search history.

(56) References Cited

U.S. PATENT DOCUMENTS

| | | | | |
|---|---|---|---|---|
| 4,193,111 A | * | 3/1980 | Wester | 363/84 |
| 5,233,509 A | * | 8/1993 | Ghotbi | 363/89 |
| 5,283,726 A | * | 2/1994 | Wilkerson | 363/41 |
| 6,556,464 B2 | * | 4/2003 | Sakai et al. | 363/132 |
| 8,363,434 B2 | * | 1/2013 | Lin | 363/44 |
| 2010/0259240 A1 | | 10/2010 | Cuk | |

* cited by examiner

*Primary Examiner* — Harry Behm
(74) *Attorney, Agent, or Firm* — Perkins Coie LLP (57) ABSTRACT

A bridgeless PFC (power factor correction) converter with improved efficiency is disclosed. The bridgeless PFC converter comprises: a first input terminal and a second input terminal configured to receive an input AC signal; an output terminal; an inductor set comprising N inductors, wherein a first terminal of each inductor is coupled to the first input terminal; and an output stage comprising (N+1) switching circuits coupled between the output terminal and a ground node.

16 Claims, 11 Drawing Sheets

BRIDGELESS PFC CONVERTER AND THE METHOD THEREOF

CROSS-REFERENCE TO RELATED APPLICATION(S)

This application claims priority to and the benefit of Chinese Patent Application No. 201010578957.6, filed Dec. 2, 2010, which is incorporated herein by reference in its entirety.

TECHNICAL FIELD

The present invention relates generally to electronic circuit, and more particularly but not exclusively to electronic circuit with PFC (Power Factor Corrector) control.

BACKGROUND

The utility power is AC (alternating voltage and alternating current), while the power consumed by most electrical and electronic equipment is DC (direct voltage and direct current), hence there is need for an AC-to-DC power conversion. A suitable controlled PFC (Power Factor Correction) converter forces an input AC current wave shape to be sinusoidal, in phase, and proportional with input AC voltage thus resulting in desirable low harmonic content and maximum available real power drawn from the AC line.

Figure 1:
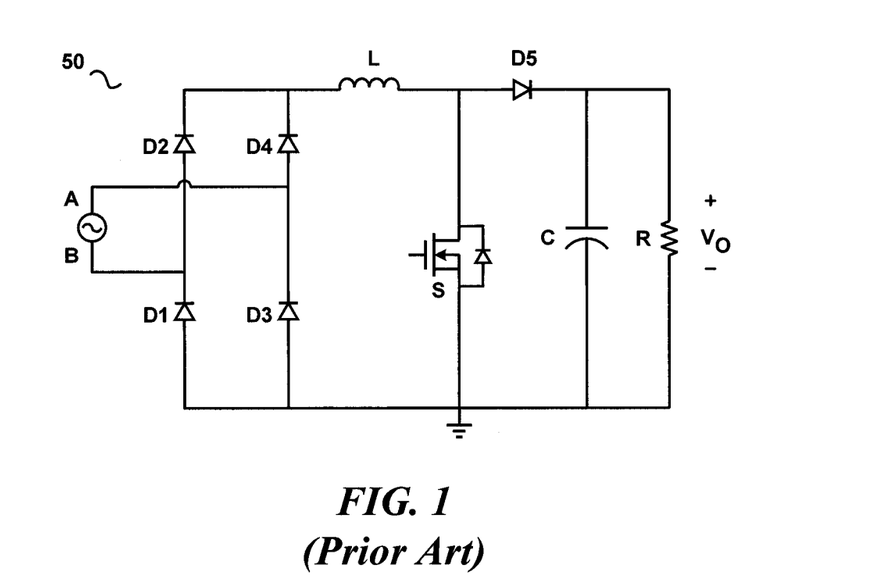
FIG. 1 schematically shows a prior art PFC converter 50.

FIG. 1 schematically shows a prior art PFC converter 50. which comprises a full bridge rectifier and a boost converter. The full bridge rectifier comprises diodes D1~D4. The boost converter comprises an inductor L, a switch S, a diode D5 and an output capacitor C coupled as shown. FIG. 1 shows the typical topology of the PFC converter which is known to persons of ordinary skill in the art. The control circuit which keeps an input current in phase with an input voltage is not shown. The boost converter supplies power to a load R. The full bridge rectifier folds an AC line voltage into a uni-directional voltage and folds an AC line current into a uni-directional current. The boost converter converts the uni-directional voltage into a DC output voltage and converts the uni-directional current into a DC output current.

In addition to boost converter losses, the input alternating current passes through the two diodes of the full bridge rectifier for either positive or negative portion of AC cycle in the PFC converter 50. The diode is inefficient and will result in the high conduction loss.

So there is a need to solve the above problems.

SUMMARY

It is an object of the present disclosure to provide a bridgeless PFC (power factor correction) converter and the method thereof.

In accomplishing the above and other objects, there has been provided, in accordance with an embodiment of the present disclosure, a bridgeless PFC converter, comprising: a first input terminal and a second input terminal configured to receive an input AC signal; an output terminal configured to provide an output signal; an inductor set comprising N inductors, wherein each inductor has a first terminal and a second terminal, and the first terminal of each inductor is coupled to the first input terminal; an output stage comprising (N+1) switching circuits coupled between the output terminal and a ground node, wherein a first switching circuit comprises a first switch and a second switch, and wherein the first switch and the second switch are coupled in series, and the conjunction of the switches in the first switching circuit is coupled to the second input terminal, and wherein each of the remaining switching circuits respectively comprises a bottom switch and a top switch, and wherein each conjunction of the switches in the remaining switching circuits is respectively coupled to the second terminal of the respective N inductors; and an output capacitor coupled between the output terminal and the ground node; wherein: N is a natural number, and wherein N≥1.

In accomplishing the above and other objects, there has been provided, in accordance with another embodiment of the present disclosure, a bridgeless PFC (power factor correction) converter, comprising: a first input terminal and a second input terminal configured to receive an input AC signal; an output terminal configured to provide an output signal to a load; an inductor having a first terminal and a second terminal, wherein the first terminal is coupled to the first input terminal; an output stage comprising a first switching circuit and a second switching circuit coupled between the output terminal and a ground node, wherein the first switching circuit comprises a first switch and a second switch, and wherein the conjunction of the first switch and the second switch is coupled to the second input terminal, and the second switching circuit comprises a bottom switch and a top switch, and wherein the conjunction of the bottom switch and the top switch is coupled to the second terminal of the inductor; and an output capacitor coupled between the output terminal and the ground node.

Furthermore, there has been provided, in accordance with an embodiment of the present disclosure, a method of control a bridgeless PFC converter, wherein the bridgeless PFC converter comprises a first input terminal and a second input terminal configured to receive an input AC signal; an output terminal configured to provide an output signal; an inductor set comprising N inductors, wherein each inductor has a first terminal and a second terminal, and the first terminal of each inductor is coupled to the first input terminal; an output stage comprising (N+1) switching circuits coupled between the output terminal and a ground node, wherein a first switching circuit comprises a first switch and a second switch, and wherein the first switch and the second switch are series coupled, and the conjunction of the switches in the first switching circuit is coupled to the second input terminal, and wherein each of the remaining switching circuits respectively comprises a bottom switch and a top switch, and wherein each conjunction of the switches in the remaining switching circuits are respectively coupled to the second terminal of the respective N inductors; an output capacitor coupled between the output terminal and the ground node; and wherein: N is a natural number and N≥1; the method comprising: during when the input AC signal is positive, keeping the first switch ON, keeping the second switch OFF, and turning ON and OFF the top switches and the bottom switches alternatively; and during when the input AC signal is negative, keeping the first switch OFF, keeping the second switch ON, and turning ON and OFF the top switches and the bottom switches alternatively.

The use of the same reference label in different drawings indicates the same of like components.

DETAILED DESCRIPTION

In the present disclosure, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 2:
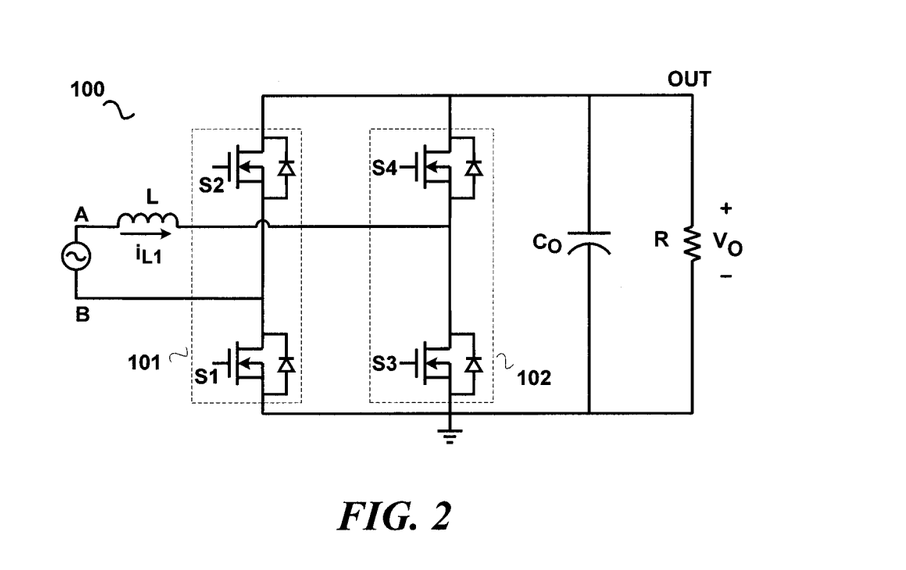
FIG. 2 schematically shows a bridgeless PFC converter 100 in accordance with an embodiment of the present disclosure.

FIG. 2 schematically shows a bridgeless PFC converter 100 in accordance with an embodiment of the present disclosure. The bridgeless PFC converter 100 comprises: a first input terminal (A) and a second input terminal (B) configured to receive an input AC signal; an output terminal (OUT) configured to provide an output signal Vo to a load R; an inductor L having a first terminal and a second terminal, wherein the first terminal is coupled to the first input terminal (A); an output stage comprising a first switching circuit 101 and a second switching circuit 102 coupled between the output terminal (OUT) and a ground node, wherein the first switching circuit 101 comprises a first switch S1 and a second switch S2, and wherein the conjunction of the first switch S1 and the second switch S2 is coupled to the second input terminal (B), and the second switching circuit 102 comprises a bottom switch S3 and a top switch S4, and wherein the conjunction of the bottom switch S3 and the top switch S4 is coupled to the second terminal of the inductor L; and an output capacitor Co coupled between the output terminal (OUT) and the ground node.

In one embodiment, the first switch S1 and the second switch S2 in the first switching circuit 101 work with low frequency and are alternatively turned ON for half of the AC cycle. The bottom switch S3 and the top switch S4 in the second switching circuit 102 work with high frequency. In one embodiment, the first and second switches work with the same frequency with the input AC signal; and the top switch and the bottom switch in the second switching circuit work with the same frequency of the PFC converter.

Persons of ordinary skill in the art should know that the switches S1~S4 comprise semiconductor switches, for example, N-type MOSFET (Metal Oxide Semiconductor Field Effect Transistor), P-type MOSFET or other semiconductor devices. In one embodiment, the switches in the switching circuits comprise N-type MOSFET. The MOSFET may have a body-diode parallel coupled with it as shown in FIG. 2. Persons of ordinary skill in the art should know that the body-diode is the parasitic diode of the switch. An extra diode could be coupled with the switch if necessary.

In one embodiment, the switches in the switching circuits are turned ON by a logical high control signal, and are turned OFF by a logical low control signal.

Below we will explain separately first the operation from the positive input AC signal and then the operation from the negative input AC signal.

Figure 3:
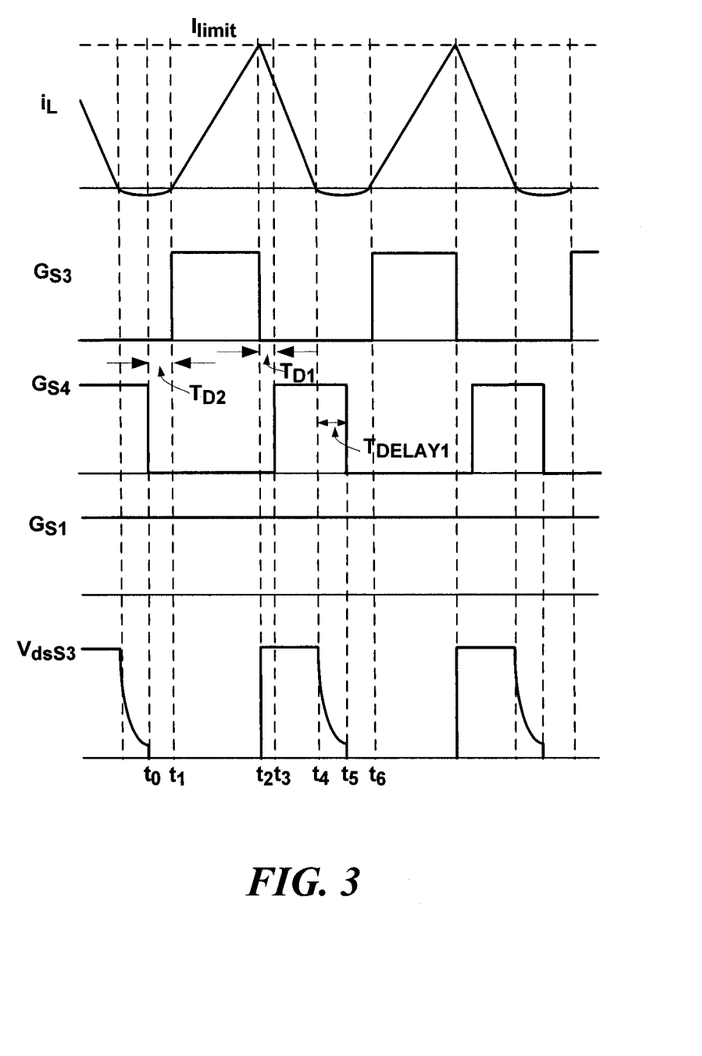
FIG. 3 shows the waveforms of the current $i_L$ flowing through the inductor L, the control signal of the switches S1, S3, S4 and the drain-source voltage of the switch S3.

FIG. 3 shows the waveforms of signals in FIG. 2. The operation from the positive input AC signal is described with respect to FIGS. 2 and 3. In FIG. 3, $i_L$ is a current flowing through the inductor L; $G_{S1}$, $G_{S3}$ and $G_{S4}$ are respective control signals of the first switch S1, the bottom switch S3 and the top switch S4; and $V_{dsS3}$ is the drain-source voltage of the bottom switch S3.

At the beginning, when the voltage at the first terminal A is higher than the voltage at the second terminal B, the first switch S1 is turned ON and the second switch S2 is turned OFF. The states of the first switch S1 and the second switch S2 maintain until the voltage at the first terminal A goes lower than the voltage at the second terminal B. The bottom switch S3 is turned ON after the top switch S4 is turned OFF. The current $i_L$ flowing through the inductor L positively increases. When the current $i_L$ reaches a peak limit $i_{limit}$, the bottom switch S3 is turned OFF and the top switch S4 is turned ON, then the current $i_L$ flowing through the inductor L positively decreases. When the current $i_L$ crosses zero from positive to negative, after a first delay time $T_{DELAY1}$, the top switch S4 is turned OFF and the bottom switch S3 is turned ON again, and the operation repeats.

In one embodiment, the bottom switch S3 and the top switch S4 are turned ON and OFF alternatively. There is a first dead time $T_{D1}$ between the OFF of the bottom switch S3 and the ON of the top switch S4, and there is a second dead time $T_{D2}$ between the OFF of the top switch S4 and the ON of the bottom switch S3. The switching circuits are coupled between input AC signal and the ground node. Persons of ordinary skill in the art should know that the dead times are added to avoid the large current from power to ground in case that the switches in each switching circuit are both ON in a instant.

The operation from the positive input AC signal is described in detailed with respect to FIGS. 4 to 8.

Figure 4:
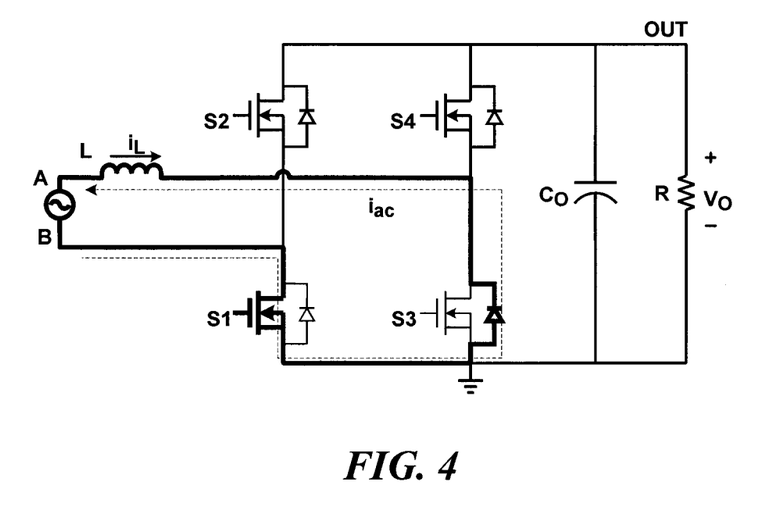
FIG. 4 shows the state of the bridgeless PFC converter 100 in subinterval $t_0$~$t_1$ of FIG. 3.

FIG. 4 shows the state of the bridgeless PFC converter 100 in subinterval $t_0$~$t_1$. In FIG. 4, the top switch S4 is turned OFF. The bottom switch S3 is still in the OFF state because of the second dead time $T_{D2}$. The body-diode of the bottom switch S3 conducts. The input AC current $i_{ac}$ is flowing in the direction shown in FIG. 4. The current $i_L$ flowing through the inductor L increases. The drain-source voltage $V_{dsS4}$ of the top switch S4 is a reverse biased voltage of the body-diode which is approximately equal to zero.

Figure 5:
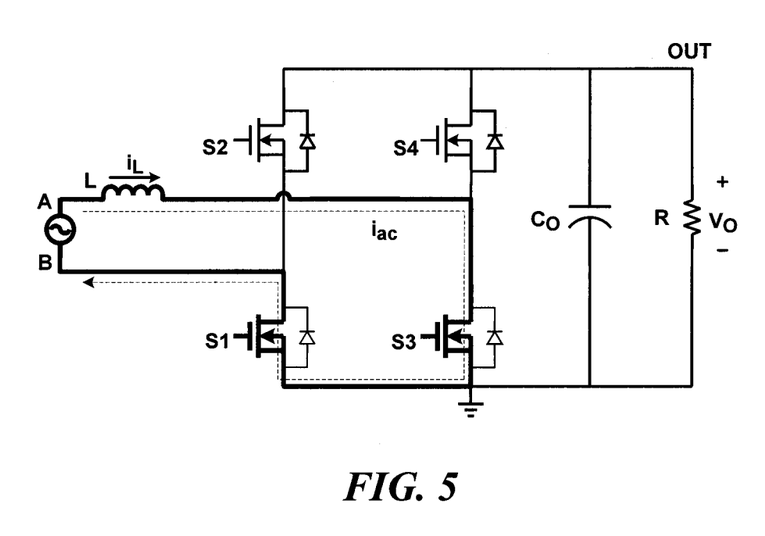
FIG. 5 shows the state of the bridgeless PFC converter 100 in subinterval $t_1$~$t_2$ of FIG. 3.

FIG. 5 shows the state of the bridgeless PFC converter 100 in subinterval $t_1 \sim t_2$. As shown in FIG. 3, at time $t_1$, the second dead time $T_{D2}$ ends. The bottom switch S3 is turned ON. The top switch S4 keeps OFF. The input AC current $i_{ac}$ is flowing in the direction shown in FIG. 5. The current $i_L$ flowing through the inductor L increases. The drain-source voltage $V_{dsS3}$ of the bottom switch S3 is approximately equal to zero at time $t_1$ as described above, so the bottom switch S3 is turned ON with zero drain-source voltage. The zero-voltage-switching (ZVS) is realized.

Figure 6:
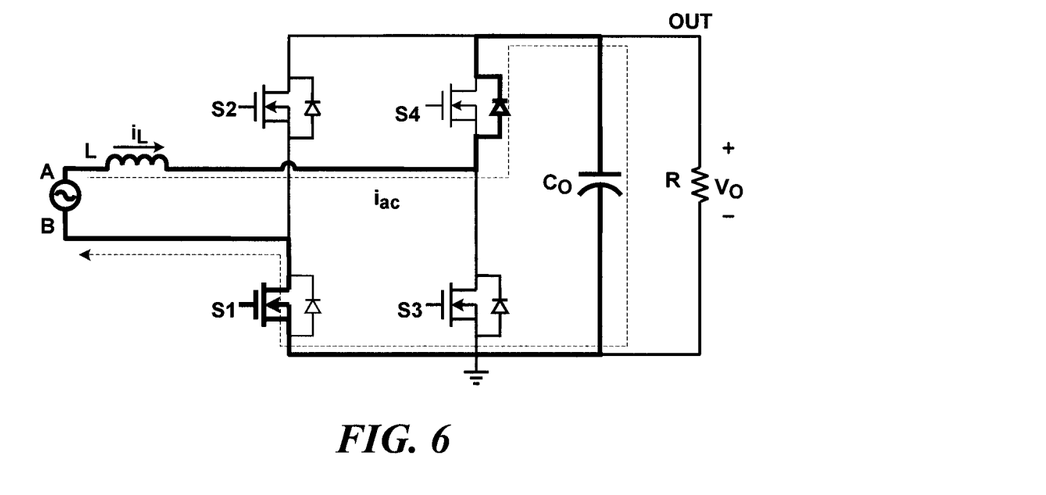
FIG. 6 shows the state of the bridgeless PFC converter 100 in subinterval $t_2$~$t_3$ of FIG. 3.

FIG. 6 shows the state of the bridgeless PFC converter 100 in subinterval $t_2 \sim t_3$. As shown in FIG. 3, the current $i_L$ flowing through the inductor L reaches the peak limit $l_{limit}$ at time $t_2$. Then the bottom switch S3 is turned OFF. The top switch S4 is still OFF because of the first dead time $T_{D1}$. The body-diode of the top switch S4 conducts. The input AC current $i_{ac}$ is flowing in the direction shown in FIG. 6. The current $i_L$ flowing through the inductor L positively decreases. The drain-source voltage $V_{dsS4}$ is the reverse biased voltage of the body-diode of the top switch S4, and the drain-source voltage $V_{dsS4}$ of the top switch S4 is approximately equal to zero.

Figure 7:
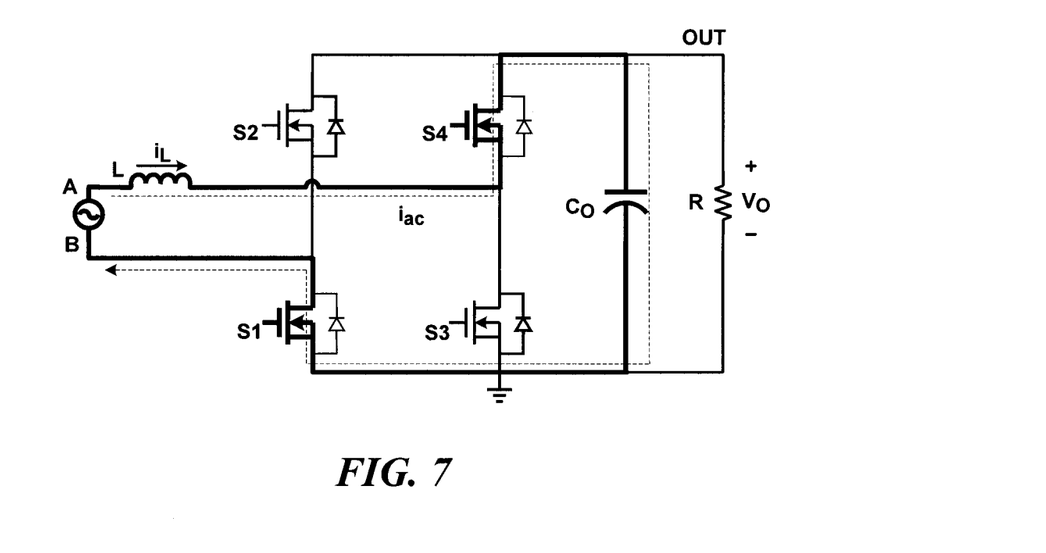
FIG. 7 shows the state of the bridgeless PFC converter 100 in subinterval $t_3$~$t_4$ of FIG. 3.

FIG. 7 shows the state of the bridgeless PFC converter 100 in subinterval $t_3 \sim t_4$. As shown in FIG. 3, the first dead time $T_{D1}$ ends at time $t_3$. The top switch S4 is turned ON. The bottom switch S3 is turned OFF. The input AC current $i_{ac}$ is flowing in the direction shown in FIG. 7. The current $i_L$ flowing through the inductor L decreases. The drain-source voltage $V_{dsS4}$ of the top switch S4 is approximately equal to zero at time $t_3$ as described above, so the top switch S4 is turned ON with zero drain-source voltage. The zero-voltage switching (ZVS) is realized.

Figure 8:
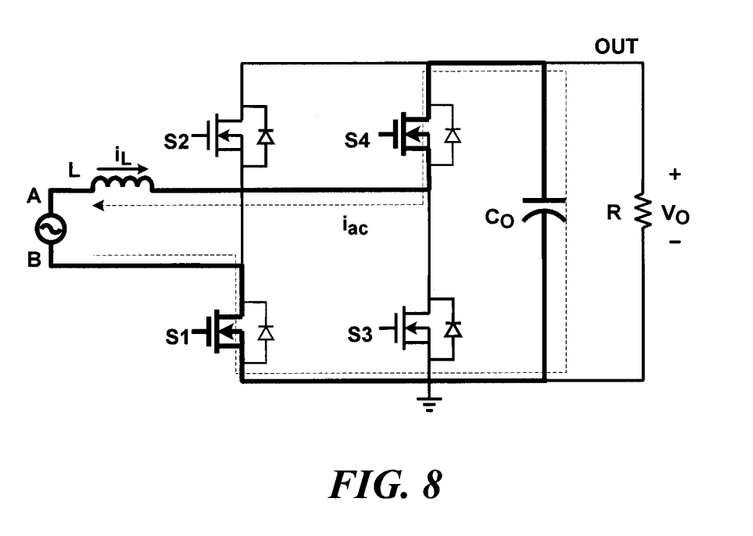
FIG. 8 shows the state of the bridgeless PFC converter 100 in subinterval $t_4$~$t_5$ of FIG. 3.

FIG. 8 shows the state of the bridgeless PFC converter 100 in subinterval $t_4 \sim t_5$. As shown in FIG. 3, the current $i_L$ flowing through the inductor L crosses zero at time $t_4$. The bottom switch S3 keeps OFF. The top switch S4 keeps ON for a first delay time $T_{DELAY1}$. The input AC current $i_{ac}$ is flowing in the direction shown in FIG. 8. The current $i_L$ flowing through the inductor L negatively increases.

At time $t_5$, the first delay time $T_{DELAY1}$ ends. The top switch S4 is turned OFF. The bottom switch S3 is still OFF because of the second dead time $T_{D2}$. The first switch S1 keeps ON and the second switch S2 keeps OFF. The body-diode of the bottom switch S3 conducts. The current $i_L$ flowing through the inductor L negatively decreases. The input AC current $i_{ac}$ is flowing in the direction shown in FIG. 4. The operation of the bridgeless PFC converter 100 in time $t_5$ is similar to the operation in time $t_0$.

In FIG. 3, the time periods of the subinterval $t_2 \sim t_3$ and the subinterval $t_4 \sim t_6$ are extended for clearly illustration purpose. Persons of ordinary skill in the art should know that the subinterval $t_2 \sim t_3$ represents the first dead time $T_{D1}$, and the subinterval $t_4 \sim t_6$ represents the first delay time $T_{DELAy1}$ and the second dead time $T_{D2}$. In real application, the subinterval $t_2 \sim t_3$ and the subinterval $t_4 \sim t_6$ are much shorter than the subinterval $t_1 \sim t_2$ and the subinterval $t_3 \sim t_4$.

Figure 9:
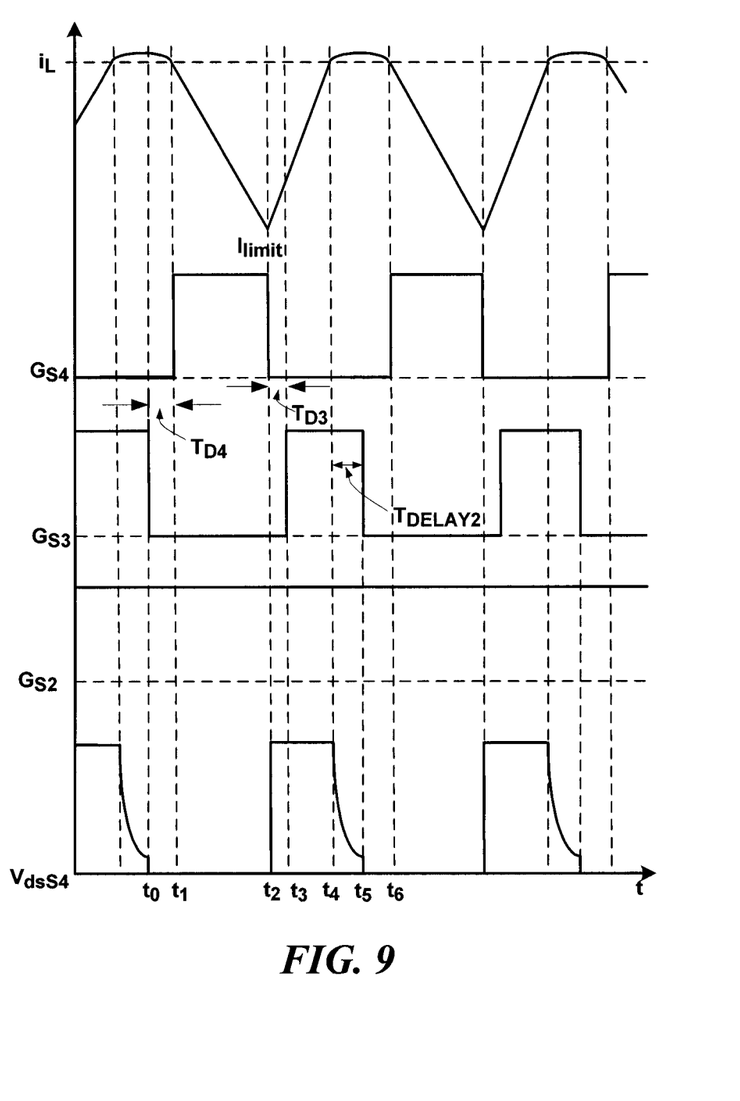
FIG. 9 shows the waveforms of the current $i_L$ flowing through the inductor L, the control signal of the switches S2, S3, S4 and the drain-source voltage of the switch S4.

FIG. 9 shows the waveforms of signals in FIG. 2. The operation from the negative input AC signal is described with respect to FIGS. 2 and 9. In FIG. 9, $i_L$ is current flowing through the inductor L; $G_{S2}$, $G_{S3}$ and $G_{S4}$ are the respective control signals of the second switch S2, the bottom switch S3 and the top switch S4; and $V_{dsS4}$ is the drain-source voltage of the top switch S4.

At the beginning of the negative portion of the input AC signal, when the voltage at the first terminal (A) is lower than the voltage at the second terminal (B), the first switch S1 is turned OFF and the second switch S2 is turned ON. The states of the first switch S1 and the second switch S2 maintain until the voltage at the first terminal (A) is higher than the voltage at the second terminal (B). The top switch S4 is turned ON after the bottom switch S3 is turned OFF. The current $i_L$ flowing through the inductor L negatively increases. When the current $i_L$ reaches the peak limit $l_{limit}$, the top switch S4 is turned OFF and the bottom switch S3 is turned ON, then the current $i_L$ flowing through the inductor L negatively decreases. When the current $i_L$ crosses zero from negative to positive, after a second delay time $T_{DELAY2}$, the bottom switch S3 is turned OFF and the top switch S4 is turned ON, then the operation repeats.

In one embodiment, the bottom switch S3 and the top switch S4 are turned ON and OFF alternatively. There is a third dead time $T_{D3}$ between the OFF of the top switch S4 and the ON of the bottom switch S3, and there is a fourth dead time $T_{D4}$ between the OFF of the bottom switch S3 and the ON of the top switch S4.

The operation from the negative input AC signal is described detailed in respect to FIGS. 10 to 14.

Figure 10:
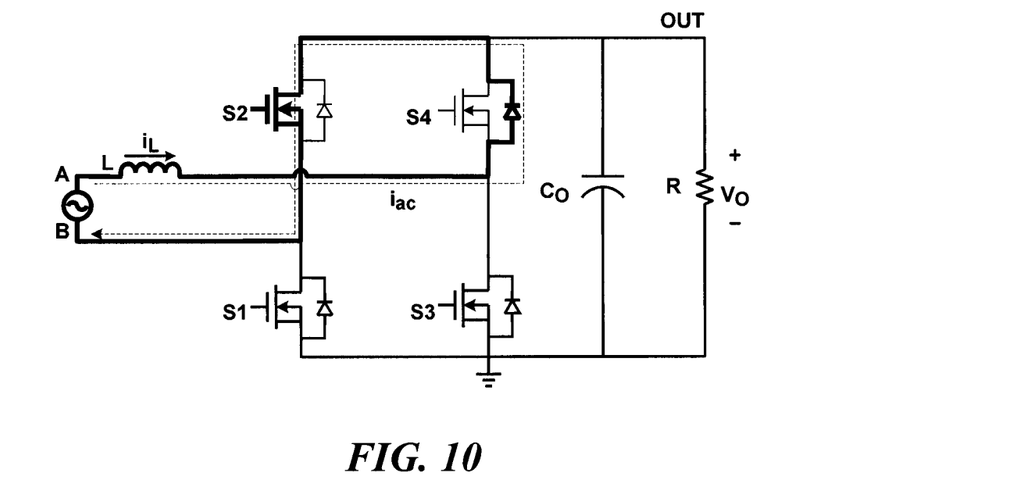
FIG. 10 shows the state of the bridgeless PFC converter 100 in subinterval $t_0$~$t_1$ of FIG. 9.

FIG. 10 shows the state of the bridgeless PFC converter 100 in subinterval $t_0 \sim t_1$ of FIG. 9. As shown in FIG. 10, the bottom switch S3 is turned OFF. The top switch S4 is in the OFF state because of the fourth dead time $T_{D4}$. The body-diode of the top switch S4 conducts. The input AC current $i_{ac}$ is flowing in the direction shown in FIG. 10. The current $i_L$ flowing through the inductor L positively decreases. The drain-source voltage $V_{dsS4}$ is the reverse biased voltage of the body-diode which is approximately equal to zero.

Figure 11:
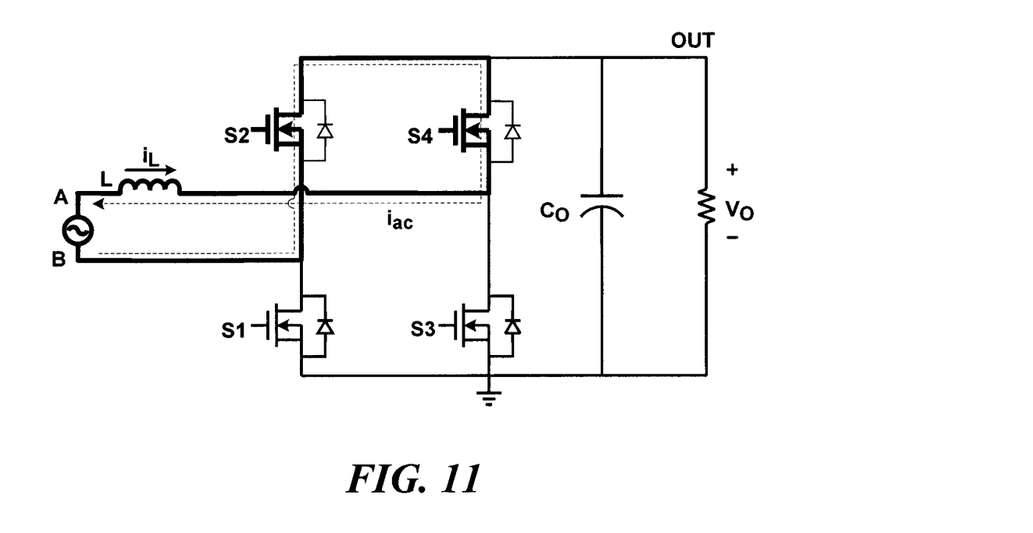
FIG. 11 shows the state of the bridgeless PFC converter 100 in subinterval $t_1$~$t_2$ of FIG. 9.

FIG. 11 shows the state of the bridgeless PFC converter 100 in subinterval $t_1 \sim t_2$ of FIG. 9. As shown in FIG. 9, at time $t_1$, the fourth dead time $T_{D4}$ ends. The top switch S4 is turned ON. The bottom switch S3 keeps OFF. The input AC current $i_{ac}$ is flowing in the direction shown in FIG. 11. The current $i_L$ flowing through the inductor L negatively increases. The drain-source voltage $V_{dsS4}$ of the top switch S4 is approximately equal to zero at time $t_1$ as described before, so the top switch S4 is turned ON with zero drain-source voltage. The zero-voltage-switching (ZVS) is realized.

Figure 12:
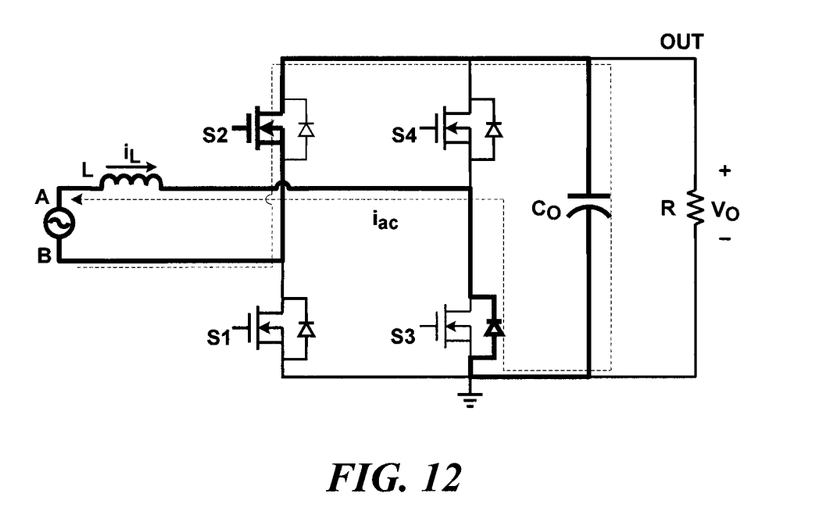
FIG. 12 shows the state of the bridgeless PFC converter 100 in subinterval $t_2$~$t_3$ of FIG. 9.

FIG. 12 shows the state of the bridgeless PFC converter 100 in subinterval $t_2 \sim t_3$ of FIG. 9. As shown in FIG. 9, the current $i_L$ flowing through the inductor L reaches the peak limit $l_{limit}$ at time $t_2$. Then the top switch S4 is turned OFF. The bottom switch S3 is still OFF because of the third dead time $T_{D3}$. The body-diode of the top switch S3 conducts. The input AC current $i_{ac}$ is flowing in the direction shown in FIG. 12. The current $i_L$ flowing through the inductor L negatively decreases. The drain-source voltage $V_{dsS3}$ is the reverse biased voltage of the body-diode which is approximately equal to zero.

Figure 13:
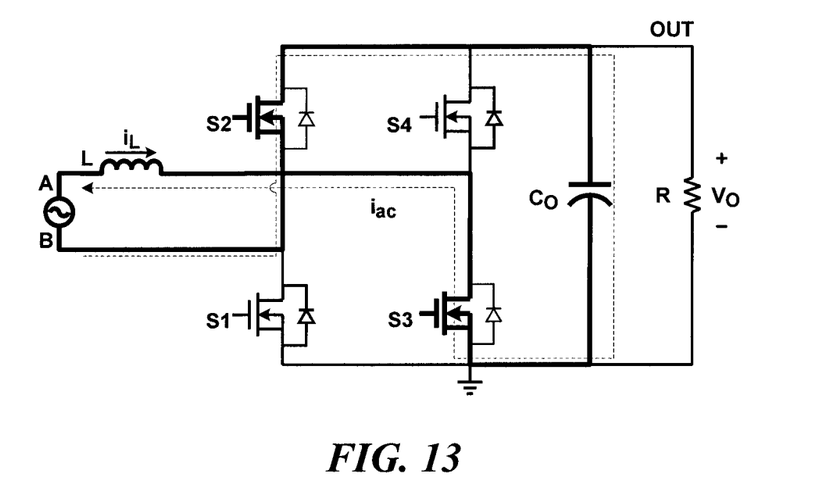
FIG. 13 shows the state of the bridgeless PFC converter 100 in subinterval $t_3$~$t_4$ of FIG. 9.

FIG. 13 shows the state of the bridgeless PFC converter 100 in subinterval $t_3 \sim t_4$ of FIG. 9. As shown in FIG. 9, the third dead time $T_{D3}$ ends at time $t_3$. The bottom switch S3 is turned ON. The top switch S4 is OFF. The second switch S2 keeps ON and the first switch S1 keeps OFF. The input AC current $i_{ac}$ is flowing in the direction shown in FIG. 13. The current $i_L$ flowing through the inductor L negatively decreases. The drain-source voltage $V_{dsS3}$ of the bottom switch S3 is approximately equal to zero at time $t_3$ as described before, so the bottom switch S3 is turned ON with zero drain-source voltage. The zero-voltage-switching (ZVS) is realized.

Figure 14:
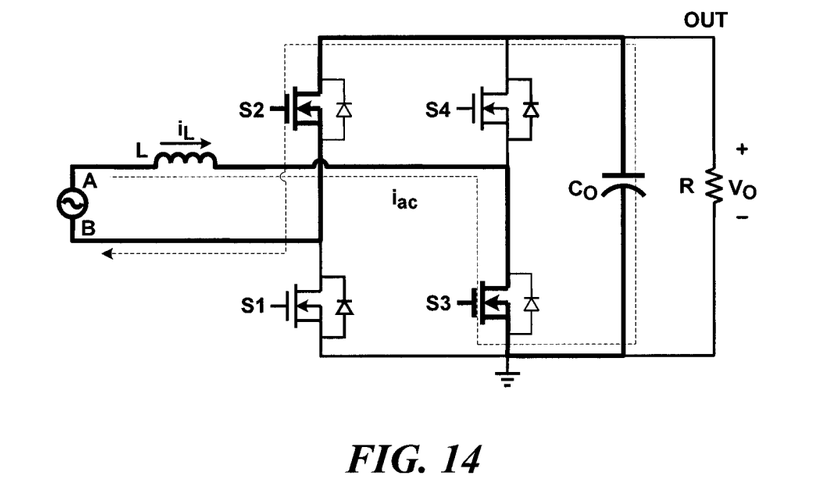
FIG. 14 shows the state of the bridgeless PFC converter 100 in subinterval $t_4$~$t_5$ of FIG. 9.

FIG. 14 shows the state of the bridgeless PFC converter 100 in subinterval $t_4 \sim t_5$ of FIG. 9. As shown in FIG. 9, at time $t_4$, the current $i_L$ flowing through the inductor L crosses zero. The bottom switch S3 keeps OFF. The top switch S4 keeps ON for a second delay time $T_{DELAY2}$ because of the propagation delay of the system. The input AC current $i_{ac}$ is flowing in the direction shown in FIG. 14. The current $i_L$ flowing through the inductor L positively increases.

At time $t_5$, the propagation delay $T_{DELAY2}$ ends. The bottom switch S3 is turned OFF. The top switch S4 is still OFF because of the fourth dead time $T_{D4}$. The second switch S2 keeps ON and the first switch S1 keeps OFF. The body-diode of the top switch S4 conducts. The current $i_L$ flowing through the inductor L positively decreases. The input AC current $i_{ac}$ is flowing in the direction shown in FIG. 10. The operation of the bridgeless PFC converter 100 in time $t_5$ is similar to the operation in time $t_0$.

In FIG. 9, the time periods of the subinterval $t_2$~$t_3$ and the subinterval $t_4$~$t_6$ are extended for clearly illustration purpose. Persons of ordinary skill in the art should know that the subinterval $t_2$~$t_3$ represents the third dead time $T_{D3}$, the subinterval $t_4$~$t_6$ represents the second delay time $T_{DELAY2}$ and the fourth dead time $T_{D4}$, and in real application, the subinterval $t_2$~$t_3$ and the subinterval t4~t6 are much shorter than the time period $t_1$~$t_2$ and the time period $t_3$~$t_4$.

As seen from the above description, there are only two switches conducting at the same time. Such that the conduction loss is saved and the efficiency is improved.

Figure 15:
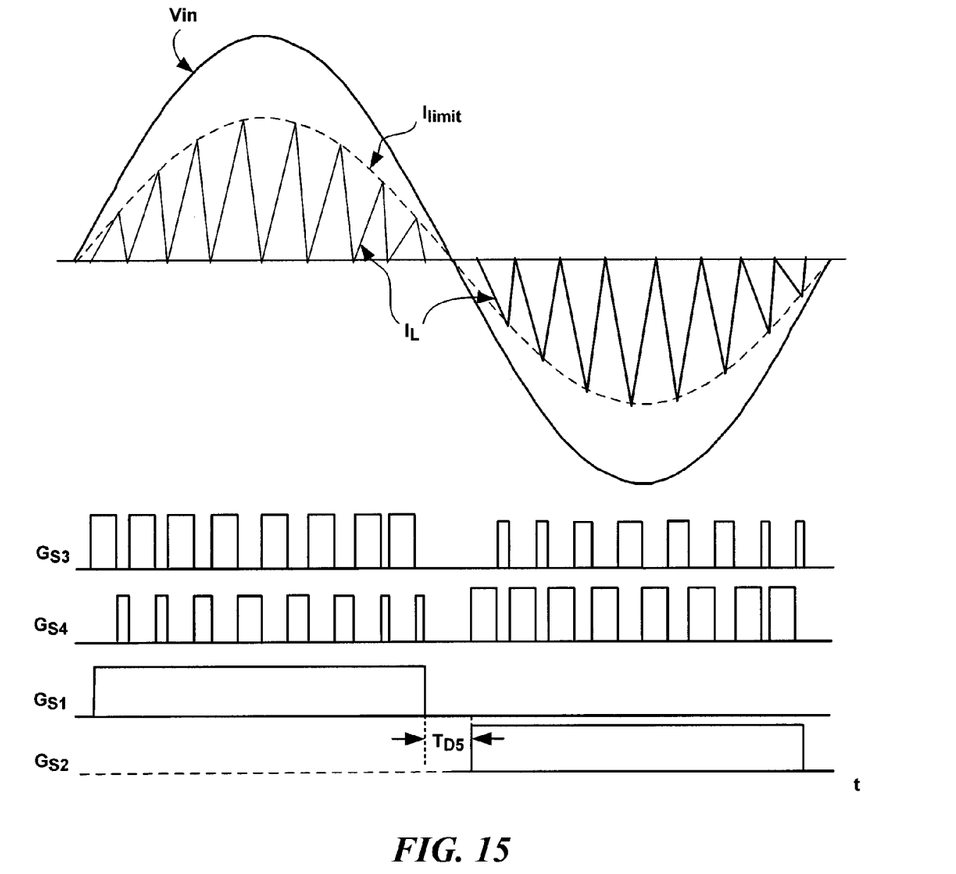
FIG. 15 shows the waveforms of the input AC signal Vin, the current $i_L$ flowing through the inductor L, the control signal of the switches S1~S4.

FIG. 15 shows the waveforms of the input AC signal Vin, the current $i_L$ flowing through the inductor L, the control signal of the switches S1~S4. The peak current limit $l_{limit}$ is a sinusoidal waveform which is similar to the input AC signal Vin despite their magnitude. When the input AC signal crosses zero, the first switch S1 and the second switch S2 are both turned OFF to avoid that the voltage across the capacitor C decreases sharply because of the unexpected ON of the first switch S1 and the second switch S2. Thus when the input AC signal crosses zero from positive to negative, a fifth dead time $T_{D5}$ is inserted between the OFF of the first switch S1 and the ON of the second switch S2. When the input AC signal crosses zero from negative to positive, a sixth dead time $T_{D6}$ is inserted between the OFF of the second switch S2 and the ON of the first switch S1. Meanwhile, the bottom switch S3 and the top switch S4 are turned OFF too in the dead times $T_{D5}$ and $T_{D6}$. In one embodiment, the fifth dead time $T_{D5}$ is equal to the sixth dead time $T_{D6}$.

Persons of ordinary skill in the art should know that the delay times are caused by propagation delay of the system. The value of every delay time is determined by the real application of the circuit.

Figure 16:
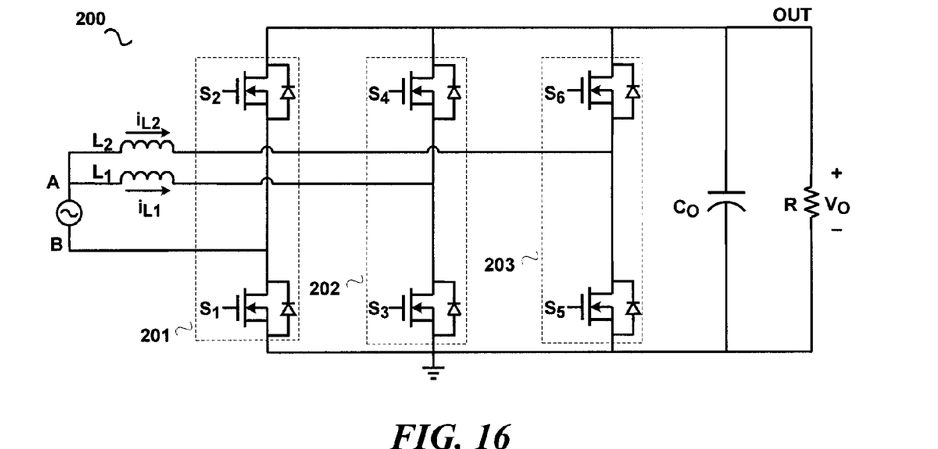
FIG. 16 schematically shows a bridgeless PFC converter 200 in accordance with an embodiment of the present disclosure.

FIG. 16 schematically shows a bridgeless PFC converter 200 in accordance with an embodiment of the present disclosure. The bridgeless PFC converter 200 comprises: a first input terminal (A) and a second input terminal (B) configured to receive an input AC signal; an output terminal configured to provide an output signal Vo; a first inductor L1 and a second inductor L2, wherein each inductor L1 has a first terminal and a second terminal, and the first terminal of each inductor is coupled to the first input terminal (A); an output stage comprising three switching circuits coupled between the output terminal and a ground node, wherein a first switching circuit 201 comprises a first switch S1 and a second switch S2 coupled in series, and the conjunction of the switches in the first switching circuit is coupled to the second input terminal (B), the second switching circuit 202 comprises a bottom switch S3 and a top switch S4 coupled in series, the conjunction of the switches is coupled to the second terminal of the first inductor L1, and the third switching circuit 203 comprises a bottom switch S5 and a top switch S6 coupled in series, the conjunction of the switches is coupled to the second terminal of the second inductor L2; and an output capacitor Co coupled between the output terminal and the ground node. In one embodiment, the bridgeless PFC converter further comprises a load R parallel coupled to the capacitor Co.

The first switch S1 and the second switch S2 in the first switching circuit 201 work with low frequency and are alternatively turned ON for half AC cycle. The bottom switches S3 and S5, and the top switches S4 and S6 in the other switching circuits work with high frequency. In one embodiment, the first and second switches work with the same frequency of the input AC signal; and the top switches and the bottom switches in the other switching circuits work with the same frequency of the PFC converter.

Persons of ordinary skill in the art should know that the switches S1~S6 comprise semiconductor switches, for example, N-type MOSFET (Metal Oxide Semiconductor Field Effect Transistor), P-type MOSFET or other semiconductor devices. In one embodiment, the switches in the switching circuits comprise N-type MOSFET. The MOSFET may have a body-diode parallel coupled with it as shown in FIG. 16. Persons of ordinary skill in the art should know that the body-diode may be the parasitic diode of the switch. An extra diode could be coupled with the switch if necessary.

In one embodiment, the switches in the switching circuits are turned ON by logical high control signals, and are turned OFF by logical low control signals.

The operation from the positive input AC signal is described below.

At the beginning, when the voltage at the first terminal (A) is higher than the voltage at the second terminal (B), the first switch S1 is turned ON and the second switch S2 is turned OFF. The bottom switch S3 is turned ON after the top switch S4 is turned OFF. The current $i_{L1}$ flowing through the inductor L positively increases. When the current $i_{L1}$ reaches a peak limit, the bottom switch S3 is turned OFF and the top switch S4 is turned ON. The current $i_{L1}$ flowing through the first inductor L1 positively decreases. When the current $i_{L1}$ crosses zero from positive to negative, after a first delay time $T_{DELAY1}$, the top switch S4 is turned OFF and the bottom switch S3 is turned ON, and the operation repeats. The top switch S6 and the bottom switch S5 operates similarly to the operation of the top switch S4 and the bottom switch S3 in the mean time. The bottom switch S5 is turned ON after the top switch S6 is turned OFF. The current $i_{L2}$ flowing through the second inductor L2 positively increases. When the current $i_{L2}$ reaches a peak limit, the bottom switch S5 is turned OFF and the top switch S6 is turned ON, and the current $i_{L2}$ flowing through the inductor L2 positively decreases. A third delay time $T_{DELAY3}$ later after the current $i_{L2}$ crosses zero from positive to negative, the top switch S6 is turned OFF and the bottom switch S5 is turned ON, and the operation repeats.

The operation from the negative input AC signal is described below.

At the beginning, when the voltage at the first terminal A is lower than the voltage at the second terminal B, the second switch S2 is turned ON and the first switch S1 is turned OFF. The top switch S4 is turned ON after the bottom switch S3 is turned OFF. The current $i_{L1}$ flowing through the inductor L1 negatively increases. When the current $i_{L1}$ reaches a peak limit, the top switch S4 is turned OFF and the bottom switch S3 is turned ON, and the current $i_{L1}$ flowing through the first inductor L1 negatively decreases. When the current $i_L$ crosses zero (from negative to positive), after a second delay time $T_{DELAY2}$, the bottom switch S3 is turned OFF and the top switch S4 is turned ON, then the operation repeats. The top switch S6 and the bottom switch S5 operates similarly to the operation of the top switch S4 and the bottom switch S3 in the mean time. The top switch S6 is turned ON after the bottom switch S5 is turned OFF. The current $i_{L2}$ flowing through the second inductor L2 negatively increases. When the current $i_{L2}$ reaches a peak limit, the top switch S6 is turned OFF and the bottom switch S5 is turned ON, and the current $i_{L2}$ flowing through the inductor L2 negatively decreases. When the current $i_{L2}$ crosses zero (from negative to positive), after a fourth delay time $T_{DELAY4}$, the bottom switch S5 is turned OFF and the top switch S6 is turned ON, then the operation repeats.

In one embodiment, the third dead time $T_{D3}$ is equal to the fourth dead time $T_{D4}$.

Persons of ordinary skill in the art should know that above relationships between the dead times are for illustration purpose. The value of the dead times could be set differently in accordance with the actual condition of the system.

The operation of the bridgeless converter 200 is similar to the operation of the bridgeless converter 100, and is not described here for brevity.

Figure 17:
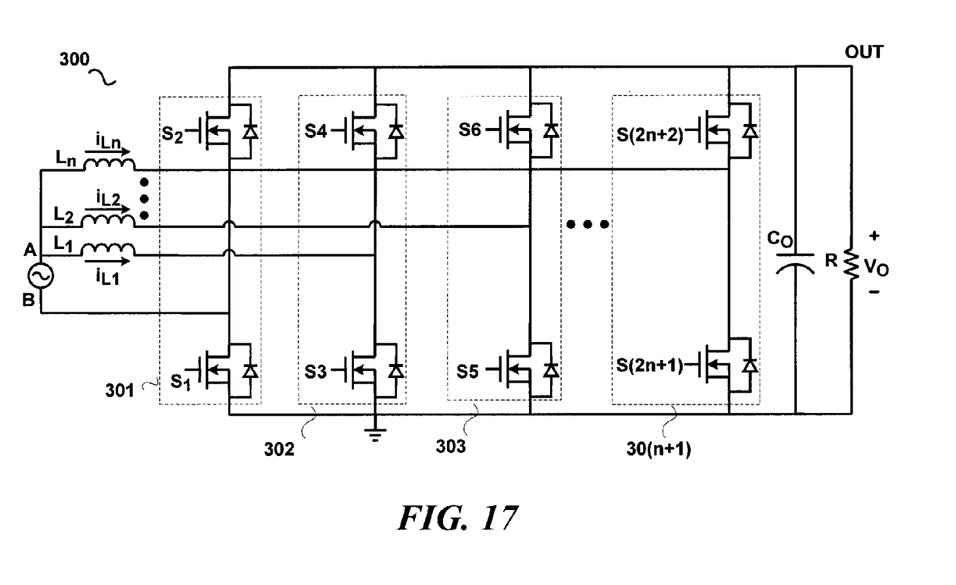
FIG. 17 schematically shows a bridgeless PFC converter 300 in accordance with an embodiment of the present disclosure.

FIG. 17 schematically shows a bridgeless PFC converter 300 in accordance with an embodiment of the present disclosure. The structure of the bridgeless PFC converter 300 is similar to the structure of the bridgeless PFC converters 100 and 200. The bridgeless PFC converter 300 comprises: a first input terminal (A) and a second input terminal (B) configured to receive an input AC signal; an output terminal configured to provide an output signal; an inductor set comprising N inductors, wherein each inductor has a first terminal and a second terminal, and the first terminal of each inductor is coupled to the first input terminal (A); an output stage comprising (N+1) switching circuits coupled between the output terminal and a ground node, wherein a first switching circuit 301 comprises a first switch S1 and a second switch S2, and wherein the first switch S1 and the second switch S2 are coupled in series, and the conjunction of the switches in the first switching circuit 301 is coupled to the second input terminal (B), and wherein each of the rest N switching circuit respectively comprises a bottom switch and a top switch, and wherein the conjunctions of the switches in the rest N switching circuits are respectively coupled to the second terminal of the N inductors; and an output capacitor Co coupled between the output terminal and the ground node; wherein: N is a nature number, and wherein N≥1.

The operation of the bridgeless PFC converter 300 is similar to the operations of the bridgeless PFC converters 100 and 200, and is not described here for brevity.

An effective technique for bridgeless PFC control has been disclosed. While specific embodiments of the present invention have been provided, it is to be understood that these embodiments are for illustration purposes and not limiting. Many additional embodiments will be apparent to persons of ordinary skill in the art reading this disclosure.

We claim:

1. A bridgeless PFC (power factor correction) converter, comprising:
a first input terminal and a second input terminal configured to receive an input AC signal;
an output terminal configured to provide an output signal;
an inductor set comprising N inductors, wherein each inductor has a first terminal and a second terminal, and the first terminal of each inductor is coupled to the first input terminal;
an output stage comprising (N+1) switching circuits coupled between the output terminal and a ground node, wherein a first switching circuit comprises a first switch and a second switch, and wherein the first switch and the second switch are coupled in series, and the conjunction of the switches in the first switching circuit is coupled to the second input terminal, and wherein each of the remaining switching circuits respectively comprises a bottom switch and a top switch, and wherein each conjunction of the switches in the remaining switching circuits is respectively coupled to the second terminal of the respective N inductors; and
an output capacitor coupled between the output terminal and the ground node; wherein:
N is a natural number, and wherein N≥1;
wherein:
the bottom switches in each switching circuit are turned ON and OFF simultaneously, the top switches in each switching circuit are turned ON and OFF simultaneously, and the bottom switches and the top switches are turned ON and OFF alternatively;
during when the input AC signal is positive: the first switch is turned ON, and the second switch is turned OFF, (1) when the current of the inductors cross zero, the top switches are turned OFF and the bottom switches are turned ON, the current flowing through the inductors positively increases; (2) when the current of the inductors reach a peak limit, the top switches are turned OFF and the bottom switches are turned ON, the current of the inductors positively decrease; (3) when the current of the inductors cross zero, the above operation repeats;
during when the input AC signal is negative: the first switch is turned OFF, and the second switch is turned ON, (1) when the current of the inductors cross zero, the bottom switches are turned OFF and the top switches are turned ON, the current flowing through the inductors negatively increases; (2) when the current of the inductors reach the peak limit, the top switches are turned OFF and the bottom switches are turned ON, the current of the inductors negatively decrease; (3) when the current of the inductors cross zero, the above operation repeats; and
wherein the peak limit has a sinusoidal waveform.

2. The bridgeless PFC converter of claim 1, wherein,
during when the input AC signal is positive, there is a first dead time between the OFF of the bottom switches and the ON of the top switches, and there is a second dead time between the OFF of the top switches and the ON of the bottom switches;
during when the input AC signal is negative, there is a fourth dead time between the OFF of the top switches and the ON of the bottom switches, and there is a third dead time between the OFF of the bottom switches and the ON of the top switches;
in the zero crossing point, there is a fifth dead time between the OFF of the first switch and the ON of the second switch; and
in the zero crossing point, there is a sixth dead time between of the OFF of the second switch and the ON of the first switch.

3. The bridgeless PFC converter of claim 1, wherein the first switch, the second switch, the bottom switches and the top switches comprise:
a N-type MOSFET; and
a body diode parallel coupled between the source and the drain of the switch.

4. The bridgeless PFC converter of claim 1, wherein
the first switch and the second switch in the first switching circuit work with low frequency; and
the top switches and the bottom switches in the rest N switching circuits work with high frequency.

5. A bridgeless PFC (power factor correction) converter, comprising:
a first input terminal and a second input terminal configured to receive an input AC signal;

an output terminal configured to provide an output signal to a load;

an inductor having a first terminal and a second terminal, wherein the first terminal is coupled to the first input terminal;

an output stage comprising a first switching circuit and a second switching circuit coupled between the output terminal and a ground node, wherein the first switching circuit comprises a first switch and a second switch, and wherein the conjunction of the first switch and the second switch is coupled to the second input terminal, and the second switching circuit comprises a bottom switch and a top switch, and wherein the conjunction of the bottom switch and the top switch is coupled to the second terminal of the inductor; and an output capacitor coupled between the output terminal and the ground node wherein:

the bottom switch and the top switch are turned ON and OFF alternatively;

wherein during when the input AC signal is positive: the first switch is turned ON, and the second switch is turned OFF, (1) when the current of the inductor crosses zero, the top switch is turned OFF and the bottom switch is turned ON, the current of the inductor positively increases; (2) when the current of the inductor reaches a peak limit, the bottom switch is turned OFF and the top switch is turned ON, the current of the inductor positively decreases; (3) when the current of the inductor crosses zero, the above operation repeats;

wherein during when the input AC signal is negative: the first switch is turned OFF, and the second switch is turned ON, (1) when the current of the inductor cross zero, the bottom switch is turned OFF and the top switch is turned ON, the current of the inductor negatively increases; (2) when the current of the inductor reaches the peak limit, the top switch is turned OFF and the bottom switch is turned ON, the current of the inductor negatively decreases; (3) when the current of the inductor crosses zero, the above operation repeats; and wherein the peak limit has a sinusoidal waveform.

6. The bridgeless PFC converter of claim 5, wherein, during when the input AC signal is positive, there is a first dead time between the OFF of the bottom switch and the ON of the top switch, and there is a second dead time between the OFF of the top switch and the ON of the bottom switch;

during when the input AC signal is negative, there is a third dead time between the OFF of the top switch and the ON of the bottom switch, and there is a fourth dead time between the OFF of the bottom switch and the ON of the top switch;

in the zero crossing point, there is a fifth dead time between the OFF of the first switch and the ON of the second switch; and in the zero crossing point, there is a sixth dead time between of the OFF of the second switch and the ON of the first switch.

7. The bridgeless PFC converter of claim 6, wherein the first dead time is equal to the third dead time, the second dead time is equal to the fourth dead time, and the fifth dead time is equal to the sixth dead time.

8. The bridgeless PFC converter of claim 6, wherein the first dead time is equal to the second dead time, the third dead time is equal to the fourth dead time, and the fifth dead time is equal to the sixth dead time.

9. The bridgeless PFC converter of claim 5, wherein the first switch, the second switch, the bottom switch and the top switch comprise N-type MOSFET.

10. The bridgeless PFC converter of claim 9, wherein each switch further comprises a body diode parallel coupled between the source and the drain of the switch.

11. The bridgeless PFC converter of claim 5, wherein the first switch and the second switch in the first switching circuit work with low frequency; and the top switch and the bottom switch in the second switching circuit work with high frequency.

12. A method of control a bridgeless PFC converter, wherein the bridgeless PFC converter comprises a first input terminal and a second input terminal configured to receive an input AC signal; an output terminal configured to provide an output signal; an inductor set comprising N inductors, wherein each inductor has a first terminal and a second terminal, and the first terminal of each inductor is coupled to the first input terminal; an output stage comprising (N+1) switching circuits coupled between the output terminal and a ground node, wherein a first switching circuit comprises a first switch and a second switch, and wherein the first switch and the second switch are series coupled, and the conjunction of the switches in the first switching circuit is coupled to the second input terminal, and wherein each of the remaining switching circuits respectively comprises a bottom switch and a top switch, and wherein each conjunction of the switches in the remaining switching circuits are respectively coupled to the second terminal of the respective N inductors; an output capacitor coupled between the output terminal and the ground node; and wherein: N is a natural number and N≥1; the method comprising:

during when the input AC signal is positive, keeping the first switch ON, keeping the second switch OFF, and turning ON and OFF the top switches and the bottom switches alternatively; and during when the input AC signal is negative, keeping the first switch OFF, keeping the second switch ON, and turning ON and OFF the top switches and the bottom switches alternatively.

13. The method of claim 12, wherein the first switch and the second switch in the first switching circuit work with low frequency; and the top switches and the bottom switches in the other N switching circuits work with high frequency.

14. The method of claim 12, wherein the first switch and the second switch in the first switching circuit works with the same frequency with the input AC signal; and the top switches and the bottom switches in the other N switching circuit work with the same frequency with the frequency of the converter.

15. The method of claim 12, wherein:

during when the input AC signal is positive: (1) when a current of the inductor crosses zero, turning OFF the bottom switch, turning ON the top switch, and the inductor is positively charged; (2) when the current of the inductor reaches a peak current limit, turning ON the bottom switch, turning OFF the top switch, the inductor is negatively discharged; (3) when the current of the inductor crosses zero, the above operation repeats; and during when the input AC signal is negative: (1) when the current of the inductor crosses zero, turning OFF the bottom switch, turning ON the top switch, and the inductor is negatively charged; (2) when the current of the inductor reaches the peak current limit, turning OFF the top switch, turning ON the bottom switch, the inductor is negatively discharged; (3) when the current of the inductor crosses zero, the above operation repeats.

16. The method of claim 15, wherein:

during when the input AC signal is positive, there is a first dead time between the OFF of the bottom switches and the ON of the top switches, and there is a second dead time between the OFF of the top switches and the ON of the bottom switches;

during when the input AC signal is negative, there is a fourth dead time between the OFF of the top switches and the ON of the bottom switches, and there is a third dead time between the OFF of the bottom switches and the ON of the top switches;

in the zero crossing point, there is a fifth dead time between the OFF of the first switch and the ON of the second switch; and in the zero crossing point, there is a sixth dead time between of the OFF of the second switch and the ON of the first switch; and wherein the first dead time is equal to the second dead time, the third dead time is equal to the fourth dead time, and the fifth dead time is equal to the sixth dead time.

\* \* \* \* \*